(12) United States Patent
Tan et al.

(10) Patent No.: US 8,817,246 B2
(45) Date of Patent: Aug. 26, 2014

(54) LENS TEST DEVICE AND METHOD

(75) Inventors: Chih Wei Tan, Hsinchu (TW); Wen Wen Teng, Hsin Chu (TW)

(73) Assignee: UMA Technologies Inc., Jubei, Hsinchu (TW)

( * ) Notice: Subject to any disclaimer, the term of this patent is extended or adjusted under 35 U.S.C. 154(b) by 0 days.

(21) Appl. No.: 13/567,378

(22) Filed: Aug. 6, 2012

(65) Prior Publication Data
US 2013/0162983 A1 Jun. 27, 2013

(30) Foreign Application Priority Data

Dec. 21, 2011 (TW) .............................. 100147623 A
Dec. 30, 2011 (TW) .............................. 100149906 A

(51) Int. Cl.
*G01B 9/00* (2006.01)

(52) U.S. Cl.
USPC ........................................ 356/124

(58) Field of Classification Search
USPC ................................. 356/124, 124.5; 359/650
See application file for complete search history.

(56) References Cited

U.S. PATENT DOCUMENTS

| 2010/0165329 A1* | 7/2010 | Lee et al. ....................... 356/124 |
| 2010/0177303 A1* | 7/2010 | Masuda et al. .............. 356/124.5 |
| 2013/0235464 A1* | 9/2013 | Yun et al. ...................... 359/650 |

* cited by examiner

*Primary Examiner* — Tarifur Chowdhury
*Assistant Examiner* — Jamil Ahmed
(74) *Attorney, Agent, or Firm* — Muncy, Geissler, Olds & Lowe, P.C.

(57) ABSTRACT

A lens testing method is disclosed which comprises the following three steps. First, test a lens under test to obtain a testing characteristic value of the lens under test for a first object distance. Second, provide a correction datum. Third, calculate a simulated characteristic value for a second object distance according to the testing characteristic value and the correction datum.

15 Claims, 5 Drawing Sheets

LENS TEST DEVICE AND METHOD

BACKGROUND OF THE INVENTION

1. Field of the Invention

The invention relates to a lens testing device and method, and more particularly, to a lens testing device and method for a plurality of object distances.

2. Description of the Related Art

Presently, lenses have been extensively applied to various kinds of mobile devices, such as cellular phones, mobile devices and digital cameras. During the manufacturing processes, qualities of lenses are subject to change due to process deviations. Therefore, the lenses need to be tested before shipping to ensure that the finished lenses meet specifications of an original design. For example, lens test at least include the following categories: an optical lens test of reciprocal projection for a finite distance, an optical lens test of reciprocal projection for an infinite distance, an optical lens test of orthographic projection for an infinite distance, and an optical lens test of orthographic projection for a finite distance.

FIG. 1A shows a diagram of a conventional lens testing device for testing a lens. A lens testing device 100a is used to test the quality of a finite-distance lens. The testing method is to place a photo sensor (such as an image sensor) at a field of view (FOV) or an angle required for testing an optical lens or an imaging system, and to perform a test for a fixed object distance so that the optical quality of the finite-distance lens is measured. Referring to FIG. 1A, the lens testing device 100a includes at least an image sensor 110, a lens under test 120 and a test graphics projection module 130. The test graphics projection module 130 includes a light source 131 and a test pattern 132. The light source 131 emits a light beam passing the test pattern 132 to form a patterned light beam. Here, different test patterns 132 can be used for different characteristics of the lens under test 120. During the test, the light beam from the light source 131 illuminates the test pattern 132 to generate the patterned light beam, and then the patterned light beam passes the lens under test 120 to illuminate the image sensor 110. The image sensors 110 capture an image and transfer the image to a host computer 150. Then, the host computer 150 analyzes the captured image to obtain the following information, such as a resolution, an opto-electronic conversion function (OECF), a grayscale, a modulation transfer function (MTF), and spatial frequency responses, or the like.

FIG. 1B shows a diagram of another conventional lens testing device for testing a lens. A lens testing device 100a is able to test the quality of an infinite-distance lens by adding a telescope 140 in front of each photo sensor (such as an image sensor) and placing the telescope 140 at a field of view (FOV) or an angle required for testing an optical lens or an imaging system so that a test image is simulated to form an image at an infinite distance, thereby achieving the purpose of testing an object at an infinite distance. More specifically, referring to FIG. 1B, the lens testing device 100b further includes at least a telescope 140. The light source 131 emits a light beam passing the test pattern 132 to form a patterned light beam. Here, different test patterns 132 can be used for different characteristics of the lens under test 120. During the test, the light beam from the light source 131 illuminates the test pattern 132 to generate the patterned light beam, and the patterned light beam is simulated by the telescope 140 to form an image at the infinite distance. Then, the patterned light beam passes the lens under test 120 to illuminate the image sensor 110. The image sensors 110 capture an image and transfer the captured image to a host computer 150 for analysis. Techniques regarding an optical lens test of orthographic projection for a finite distance and an optical lens test of orthographic projection for an infinite distance are similar to an optical lens test of reciprocal projection for a finite distance and an optical lens test of reciprocal projection for an infinite distance. In general, their differences are different positions of the image sensor 110 and the test graphics projection module 130. The above-mentioned techniques are well known in the art and thus detailed description is omitted for the sake of brevity.

When a video conference or an autodyne is performed by a cellular phone, a shooting distance between a lens of a cellular phone and a subject is usually less than an arm's length, which is around 400~600 mm. When a cellular phone is used to shoot a landscape scene, the shooting distance between the lens and the landscape is more than two meters or even farther. Therefore, the best solution is to test a lens for both a finite object distance and an infinite object distance to determine the quality of the lens.

However, as mentioned above, the lens testing device 100a or 100b performs an optical test for either the finite object distance or the infinite distance without a comprehensive consideration of the demand of a plurality of working distances.

SUMMARY OF THE INVENTION

An object of one embodiment of the invention is to provide a lens testing device and method for a plurality of object distances.

According to one embodiment of the invention, a lens testing method is provided for a lens testing device to test a lens under test. The lens testing method comprises the following steps: testing a lens under test to obtain a testing characteristic value of the lens under test for a first object distance; providing a correction datum; and, calculating a simulated characteristic value for a second object distance according to the testing characteristic value and the correction datum. In a preferred embodiment, the correction datum comprises relation values of characteristic values between different object distances.

In one embodiment, the lens testing method further comprises a step of determining a grade of the lens under test according to the testing characteristic value, the simulated characteristic value and at least a grade condition. In a preferred embodiment, the lens testing method further comprises a step of providing the at least one grade condition and setting a corresponding table between the at least a condition and the grade of the lens under test. Besides, the step of determining the grade of the lens under test further comprises a step of determining the grade of the lens under test according to the corresponding table between the at least a condition and the grade of the lens under test.

In one embodiment, the step of providing the correction datum comprises a step of calculating the correction datum by optical simulation according to design specifications of the lens under test.

In one embodiment, the step of providing the correction datum comprises: testing a correction lens for a plurality of different object distances; and, calculating the correction datum according to a testing result of testing the correction lens.

In one embodiment, the first object distance is a finite object distance, and the second object distance is an infinite object distance. In one embodiment, the first object distance is an infinite object distance, and the second object distance is a finite object distance.

In one embodiment, the testing characteristic value is a testing modulation transfer function (MTF) value or a testing back focus length (BFL) value, and the simulated characteristic value is a simulated MTF value or a simulated BFL value.

According to one embodiment, a lens testing device is provided for testing a lens under test. The lens testing device comprises a host computer and a plurality of image sensors. A plurality of the image sensors are coupled to the host computer and supply an image of the lens under test for a first object distance to a processing unit of the host computer. The host computer includes a storage unit for storing a correction datum and a processing unit. The processing unit performs the steps of obtaining a testing characteristic value of the lens under test for the first object distance according to the image; reading out the correction datum; and, calculating a simulated characteristic value for a second object distance according to the testing characteristic value and the correction datum.

In one embodiment, the correction datum comprises relation values of characteristic values between different object distances.

In one embodiment, the correction datum is obtained by optical simulation according to design specifications of the lens under test.

In one embodiment, the correction datum is obtained by testing a correction lens for a plurality of different object distances and then calculating according to a testing result of testing the correction lens.

According to one embodiment of the invention, after two structures of the infinite object distance and the finite object distance are integrated, regardless of which testing system, such as a first testing system for an infinite object distance or a second testing system for a finite distance, a grade determination of a lens under test for a finite object distance, an infinite object distance and multiple object distances is provided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
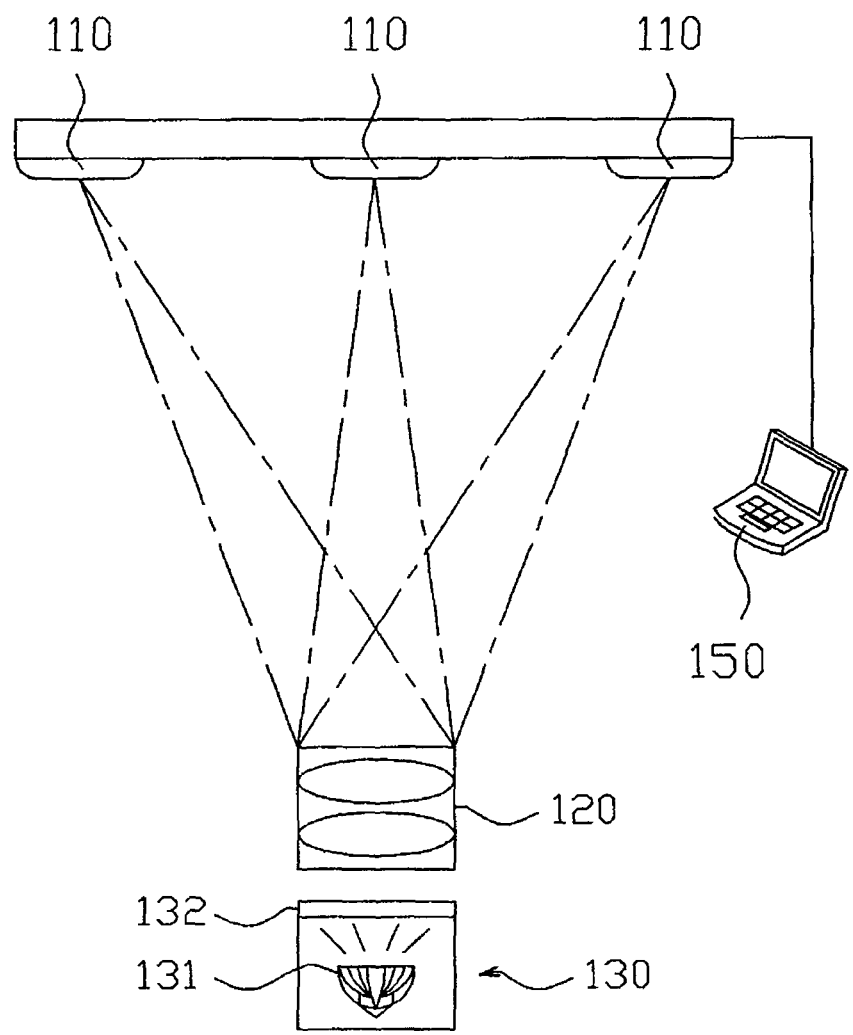
FIG. 1A shows a diagram of a conventional testing device for testing a lens.
Figure 1B:
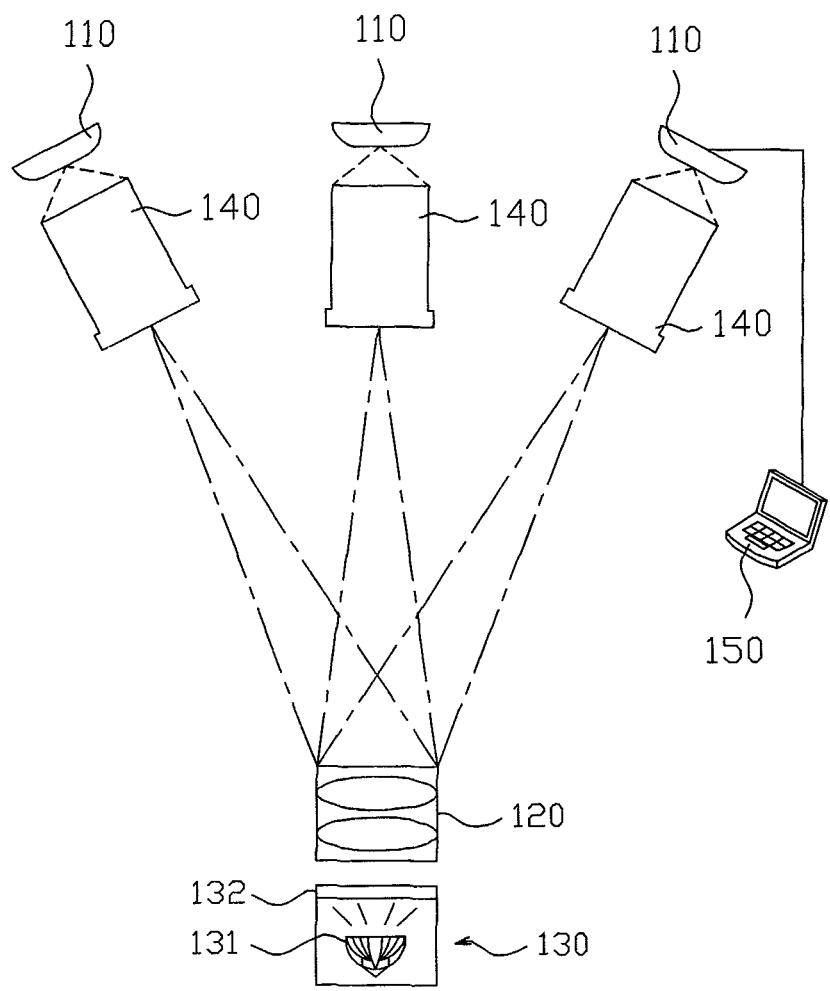
FIG. 1B shows a diagram of another conventional testing device for testing a lens.
Figure 2:
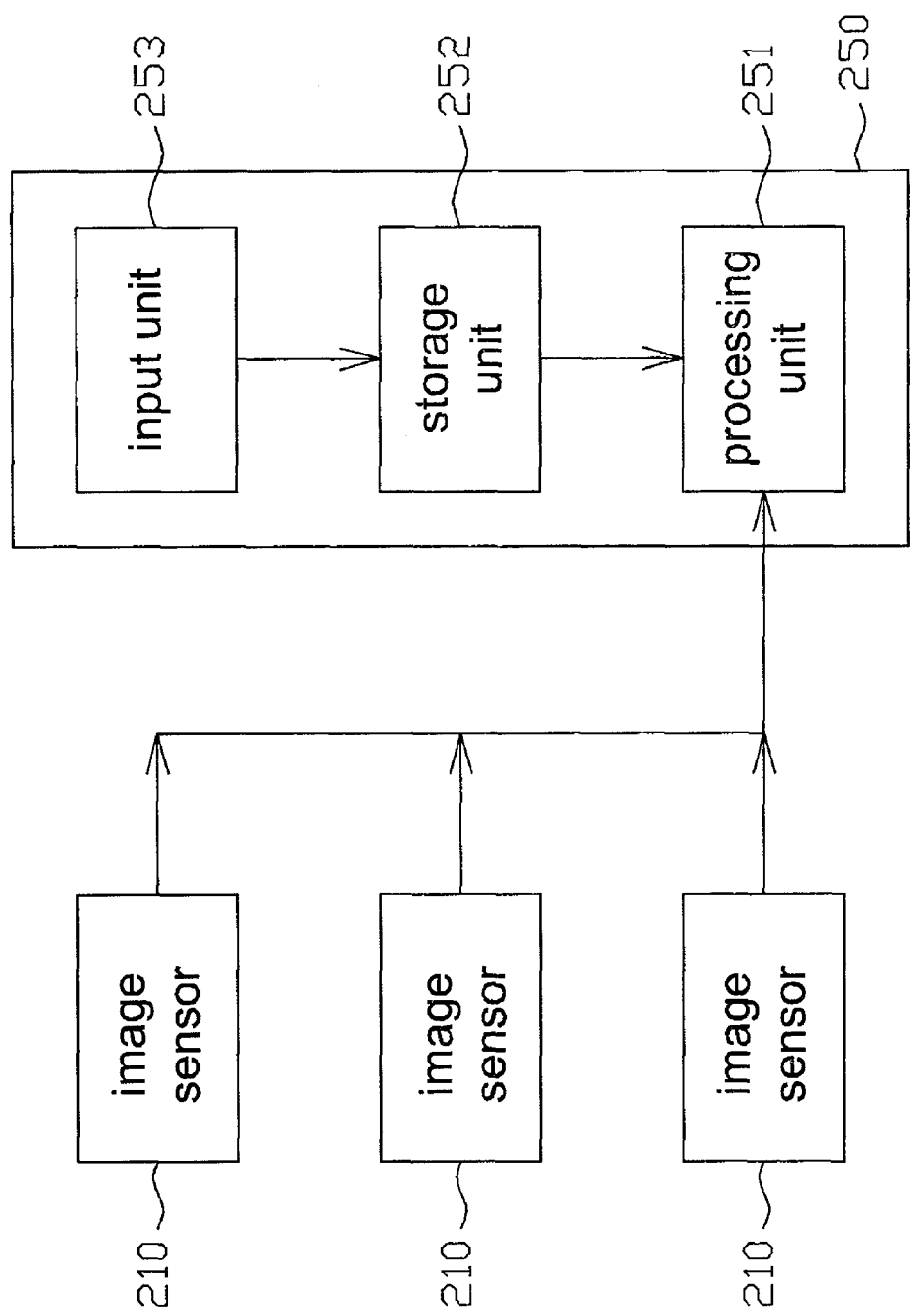
FIG. 2 shows a function block diagram of a lens testing device according to one embodiment of the invention.

FIG. 2 shows a function block diagram of a lens testing device according to one embodiment of the invention. A lens testing device 200 includes a plurality of image sensors 210 and a host computer 250. The plurality of the image sensors 210 are separately located at different fields of view (FOVs), such as a FOV of 0F (a center of FOV), a FOV of 0.7F and a FOV of 1.0F. The image sensors 210 are coupled to the host computer 250 and used to capture images at different FOVs. After receiving the images, the processing unit 251 respectively calculates optical characteristic values for each of FOVs, such as a MTF value, a back focus length (BFL) value, resolution, OECF, a gray scale and spatial frequency responses. The host computer 250 includes an input unit 253, a storage unit 252 and the processing unit 251. The input unit 253 is used to input necessary data, including, without limitation, at least a grade condition, correction datum, and optical specifications of a lens under test 120. The storage unit 252 is used to store the necessary data, including, without limitation, at least a grade condition, the correction datum, and the optical specifications of the lens under test 120. The processing unit 251 is used to calculate testing optical characteristic values, design optical characteristic values and simulated optical characteristic values of the lens under test 120, such as a testing MTF value, a design MTF value and a simulated MTF value.

Figure 3:
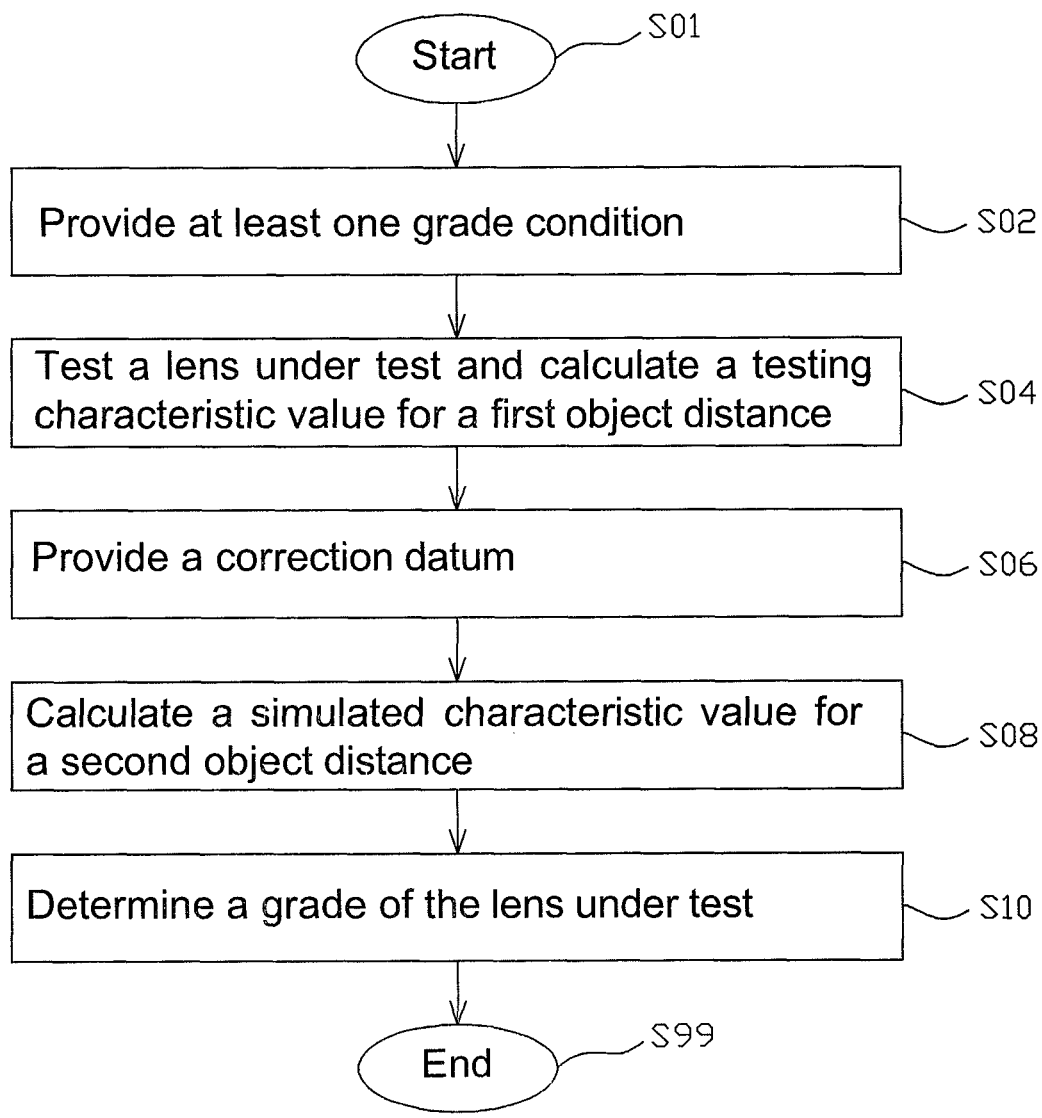
FIG. 3 shows a flow chart of a lens testing method according to one embodiment of the invention.

FIG. 3 shows a flow chart of a lens testing method according to one embodiment of the invention. As shown in FIG. 3, a lens testing method of the invention includes the steps as follow.

Step S02: Provide at least one grade condition. In one embodiment, a corresponding table (will be described later) between the at least a grade condition and a grade of the lens under test 120 can further be set. More specifically, conditions of a testing specification are set as table 1 below.

TABLE 1

| Object Distance | Condition of a FOV of 0F | Condition of a FOV of 0.7F | Condition of a FOV of 1.0F |
|---|---|---|---|
| Infinity | Condition 1: 0F MTF > 0.7 | Condition 2: 0.7F MTF > 0.6 | Condition 3: 1.0F MTF > 0.6 |
| 800 mm | Condition 4: 0F MTF > 0.7 | Condition 5: 0.7F MTF > 0.6 | Condition 6: 1.0F MTF > 0.6 |
| 400 mm | Condition 7: 0F MTF > 0.7 | Condition 8: 0.7F MTF > 0.6 | Condition 9: 1.0F MTF > 0.6 |

The table 1 above includes nine conditions. The term "0F MTF>0.7" represents a MTF value is greater than 0.7 at a FOV of 0F (i.e. a center of FOVs); the term "0.7F MTF>0.6" represents a MTF value is greater than 0.6 at a FOV of 0.7F; the term "1.0F MTF>0.6" represents a MTF value is greater than 0.6 at of a FOV of 1.0F. Likewise, the terms of the other conditions can be deduced according to the above descriptions. Please be noted that, in the above disclosure, the kinds and the number of the conditions are not limitations of the invention and thus can be increased or reduced according to demands.

Step S04: Test a lens under test 120 and calculate a testing characteristic value, for example a MTF value or a BFL value, of the lens under test 120 for a first object distance.

Step S06: Provide a correction datum, including relation values of the optical characteristic values between different object distances. In one embodiment, original design specifications of the lens under test 120 can be used to calculate the correction datum by optical simulation. In another embodiment, a correction lens can be selected from a plurality of manufactured lenses; meanwhile, the correction lens performs testing based on each of object distances and FOVs. Next, the testing results are organized as the correction datum. Finally, the correction datum is stored in the storage unit 252 in advance.

Step 08: Calculate a simulated characteristic value, such as a simulated MTF value or a simulated BFL value, for a second object distance by interpolation or extrapolation according to the testing characteristic values and the correction datum. Here, the first object distance is different from the second object distance. In a preferred embodiment, the first object distance is a finite distance and the second object distance is an infinite distance, or the first object distance is an infinite distance and the second object distance is a finite distance. Besides, when the lens under test 120 is a lens of a cellular phone or a mobile device and a user frequently uses the lens under test 120 to shoot subjects at short-range distances, the first object distance is a finite distance in a more preferred embodiment. Furthermore, the step S08 is performed by the processing unit 251, which can be implemented by using a processor with any existing or yet-to-be developed optical software, such as an optical test software, an optical simulation software or an statistics-induction-analysis-summarization software.

Step S10: Determine a grade of the lens under test 120 according to the testing characteristic values, simulated characteristic values and the at least a grade condition.

In conventional techniques, a testing device 100a or 100b needs to perform a testing procedure more than twice to simultaneously obtain optical characteristics of the lens under test 120 at the finite and infinite object distances. By contrast, in one embodiment of the invention, the optical characteristics of the lens under test 120 for the finite and infinite object distances can be obtained by actually testing the lens under test 120 for the first object distance and only calculating the optical characteristic values of the lens under test 120 for the second object distance using simulation.

Figure 4:
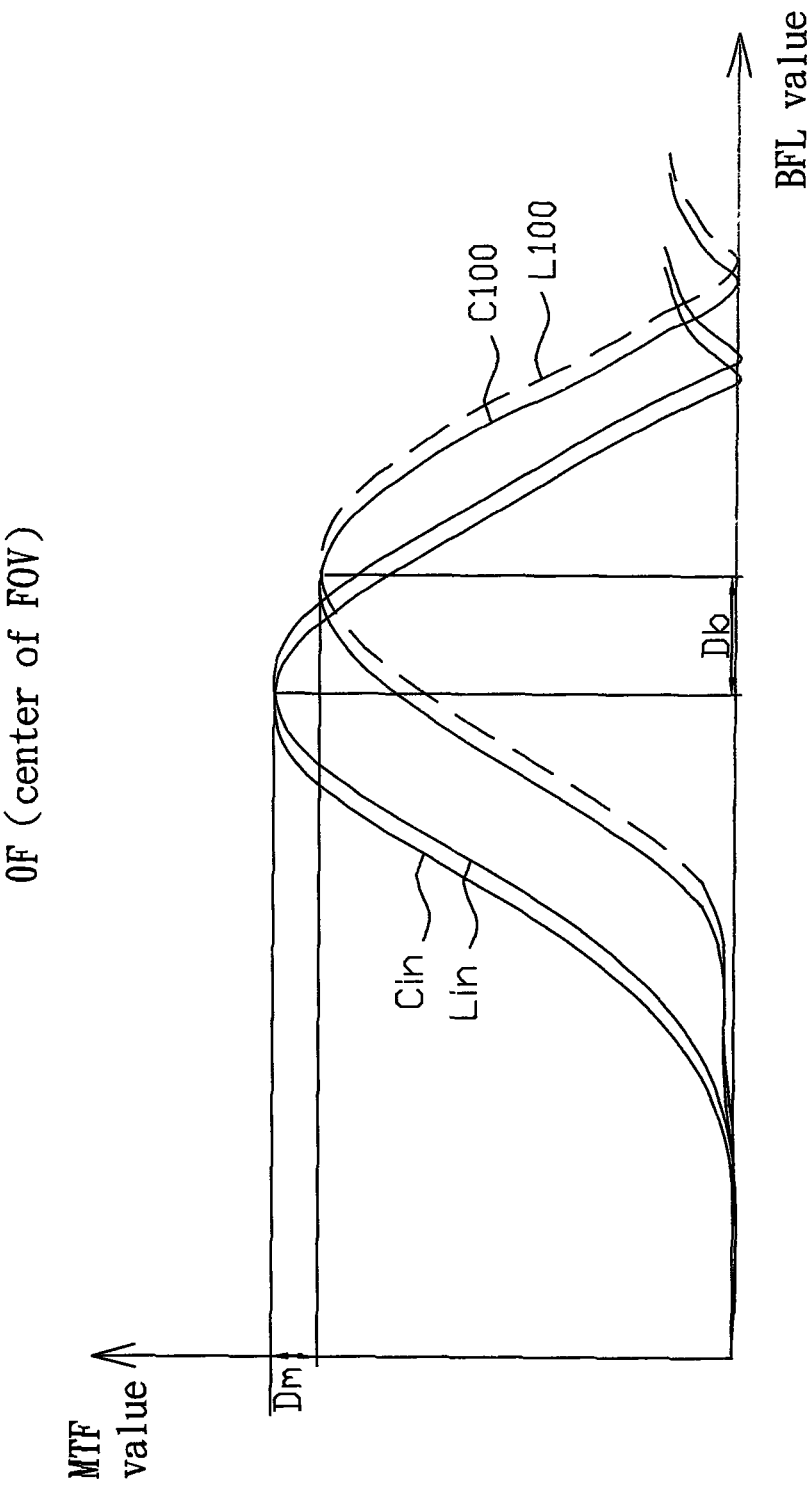
FIG. 4 shows MTF and BFL curves for a center of FOVs (0F).

Hereinafter, the MTF value and BFL value are used as examples to describe more specifically a testing method of one embodiment of the invention. FIG. 4 shows MTF and BFL curves for a center of FOVs (0F), where a curve Cin is a correction curve for the infinite object distance, and a curve C100 is a correction curve for a finite object distance of 100 mm. The methods of obtaining the Cin and C100 curves are not the limitations of the invention. In one embodiment, the Cin and C100 curves can be obtained by using the original optical specifications of the lens under test 120 and an optical simulation software, and thus to save the time taken for testing the correction lens. In a preferred embodiment, a plurality of the Cin and C100 curves for different FOVs and object distances can be further derived. The original optical specifications of the lens under test 120 are designed by a designer according to optical requirements of a product. Based on the original optical specifications, the optical characteristic values, such as the MTF and BFL values, of the lens under test 120 in ideal condition can be calculated or simulated. In another embodiment, the lens testing devices 100a and 100b can be separately used to test the correction lens; meanwhile, the curves Cin and C100 are obtained according to test results. Thus, process deviations are able to be taken into consideration and more precise testing values can be obtained.

The relation between two peaks of the Cin and C100 curves can be calculated by using the Cin and C100 curves. FIG. 4 only shows the MTF and BFL curves for the infinite and 100 mm object distances for the FOV of 0F. In the embodiment, as shown in FIG. 4, a difference value Db between the peaks of the Cin and C100 curves on x-axis (BFL value) is obtained, and a difference value Dm on y-axis (MTF value) is obtained. The corresponding difference values between the MTF and BFL curves for other FOVs (such as 0.7F and 1.0F) and other object distances (such as 400 mm) can be derived according to the above-mentioned method and FIG. 4. Finally, the relations are stored in table 2 as correction datum to establish a correction table, including the difference values between the optical characteristic values for the different object distances.

TABLE 2

| | Infinite object distance: 100 mm object distance | Infinite object distance: 400 mm object distance |
|---|---|---|
| FOV of 0F | ΔBFL = Db<br>ΔMTF = Dm | . . . |
| FOV of 0.7F | . . . | . . . |
| FOV of 1.0F | . . . | . . . |

In one embodiment, a mathematic algorithm is used to convert the data of table 2 into a correction function as the correction datum. The correction table and the correction function can be stored in the storage unit 252 in advance.

Referring again to FIG. 4, in step S04, the testing device 100b is used to test the lens under test 120 for the FOV of 0F and the infinite object distance to obtain a curve Lin so that the MTF and BFL values of the lens under test 120 for the FOV of 0F and the infinite object distance are calculated. In step S08, according to the correction table of table 2 and the MTF and BFL values of the lens under test 120 for the FOV of 0F and the infinite object distance, simulated MTF and BFL values for the FOV of 0F and a 100-mm object distance are calculated by interpolation or extrapolation, i.e. the peak value of curve L100. Therefore, the optical characteristic values of the lens under test 120 for a plurality of object distances can be simultaneously obtained and the testing time can be reduced by actually testing the lens under test 120 for one object distance.

In step S10, a corresponding table between the at least a grade condition and the grade of the lens under test 120 can also be set according to different products. Especially for a condition that the grade of the lens under test 120 is determined by multiple MTF values for the different object distances, more than two of the nine conditions in table 1 and a union or intersection of the nine conditions can be used as criteria to determine the grade of the lens under test 120. For example, the grade of the lens under test 120 is set as A when both the testing MTF value and the simulated MTF value meet all the conditions 1~9; in addition, the grade of the lens under test 120 is set as B when both the test MTF value and the simulated MTF value meet six conditions of the conditions 1~9. Likewise, the corresponding table between the grade condition and the grade of the lens under test 120 is thus established.

In one embodiment, an application product suitable for the lens under test 120 can also be determined. For example, when both the test MTF value and the simulated MTF value meet the conditions 1~3, it represents the lens under test 120 is adapted to shoot subjects at long distances. When both the test MTF value and the simulated MTF value meet the conditions 7~9, it represents the lens under test 120 is suitable to shoot subjects at short distances, for example a cellular phone or a mobile device.

In sum, according to a lens testing device of one embodiment of the invention, regardless of a reciprocal-projection or orthographic-projection testing structure, after testing results of the lens testing device 100a for a finite object distance are obtained, a testing method of one embodiment of the invention derives simulated optical characteristic values (simulated characteristic values) for the different object distances by interpolation or extrapolation according to the real testing results of optical characteristic values (testing characteristic values). Then, the lens under test 120 is classified according to the testing characteristic value, simulated characteristic values and the at least a grade condition.

According to one embodiment of the invention, two testing structures for a finite distance and an infinite distance are integrated to form a testing structure with multiple functions. In one embodiment, a determination-mode function (step S10) is further added.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for testing a lens under test, applied in a lens testing device, comprising:
    using a plurality of image sensors of the lens testing device to test the lens under test and provide an image of the lens under test for a first object distance, and obtaining a testing characteristic value of the lens under test for the first object distance according to the image;
    providing a correction datum comprising relation values of characteristic values between different object distances, and the the step of providing a correction datum comprising
    obtaining a correction curve for the first object distance;
    obtaining a correction curve for the second object distance; and
    forming the correction datum by calculating the relation values between the correction curve for the first object distance and the correction curve for the second object distance; and
    calculating by a processing unit of the lens testing device a simulated characteristic value for the second object distance according to the testing characteristic value for the first object distance and the correction datum.

2. The method according to claim 1, wherein the step of calculating the relation values between the correction curve for the first object distance and the correction curve for the second object distance comprising:
    obtaining a difference value between peaks of correction curves for the first and second object distances on a first axis; and
    obtaining a difference value between peaks of correction curves for the first and second object distances on a second axis.

3. The method according to claim 2, further comprising:
    determining a grade of the lens under test according to the testing characteristic value, the simulated characteristic value and at least one grade condition.

4. The method according to claim 3, further comprising:
    providing the at least a grade condition and setting a corresponding table between the at least one grade condition and the grade of the lens under test;
    wherein the step of determining further comprises:
    determining the grade of the lens under test according to the corresponding table between the at least a grade condition and the grade of the lens under test.

5. The method according to claim 1, wherein
    the step of obtaining a correction curve for the first object distance comprises: calculating the correction curve for the first object distance by optical simulation according to design specifications of the lens under test, and
    the step of obtaining a correction curve for the second object distance comprises: calculating the correction curve for the second object distance by optical simulation according to design specifications of the lens under test.

6. The method according to claim 1,
    the step of obtaining a correction curve for the first object distance comprises: using the plurality of image sensors of the lens testing device to provide an image of a correction lens for the first object distance, and obtaining the correction curve of the correction lens for the first object distance according to the image of the correction lens for the first object distance, and
    the step of obtaining a correction curve for the second object distance comprises: using the plurality of image sensors of the lens testing device to provide an image of the correction lens for the second object distance, and obtaining the correction curve of the correction lens for the second object distance according to the image of the correction lens for the second object distance.

7. The method according to claim 2, wherein the first object distance is a finite object distance and the second object distance is an infinite object distance.

8. The method according to claim 2, wherein the first object distance is an infinite object distance and the second object distance is a finite object distance.

9. The method according to claim 2, wherein the testing characteristic value is a testing modulation transfer function (MTF) value or a testing back focus length (BFL) value, and wherein the simulated characteristic value is a simulated MTF value or a simulated BFL value.

10. A lens testing device for testing a lens under test, comprising:
    a host computer comprising:
    a storage unit for storing a correction datum comprising relation values of characteristic values between different object distances, wherein the correction datum further comprises the relation values between the correction curve for the first object distance and the correction curve for the second object distance; and
    a processing unit; and
    a plurality of image sensors coupled to the host computer for supplying an image of the lens under test for a first object distance to the processing unit;
    wherein the processing unit performs the steps of:
    obtaining a testing characteristic value of the lens under test for the first object distance according to the image;
    reading out the correction datum; and
    calculating a simulated characteristic value for the second object distance according to the testing characteristic value for the first object distance and the correction datum.

11. The lens testing device according to claim 10, wherein the relation values between the correction curve for the first object distance and the correction curve for the second object distance comprises:
    a difference value between peaks of correction curves for the first and second object distances on a first axis; and
    a difference value between peaks of correction curves for the first and second object distances on a second axis.

12. The lens testing device according to claim 11, wherein the correction curves for the first and second object distances is obtained by optical simulation according to design specifications of the lens under test.

13. The lens testing device according to claim 11, wherein the correction curve for the first object distance is obtained from a step of using the plurality of image sensors of the lens testing device to provide an image of a correction lens for the first object distance, and obtaining the correction curve of the correction lens for the first object distance according to the image of the correction lens for the first object distance, and the correction curve for the second object distance is obtained from a step of using the plurality of image sensors of the lens testing device to provide an image of the correction lens for the second object distance, and obtaining the correction curve of the correction lens for the second object distance according to the image of the correction lens for the second object distance.

14. The lens testing device according to claim 11, wherein the testing characteristic value is a testing MTF value or a testing BFL value, and the simulated characteristic value is a simulated MTF value or a simulated BFL value.

15. The lens testing device according to claim 11, wherein the first object distance is a finite object distance, and the second object distance is an infinite object distance.

* * * * *